United States Patent [19]

Kunz

[11] Patent Number: 5,240,204
[45] Date of Patent: Aug. 31, 1993

[54] LIFT GENERATING METHOD AND APPARATUS FOR AIRCRAFT

[76] Inventor: Bernard P. Kunz, 4190 Hanover Ave., Boulder, Colo. 80303

[21] Appl. No.: 732,637

[22] Filed: Jul. 19, 1991

[51] Int. Cl.$^5$ ............................................. B64C 27/22
[52] U.S. Cl. .................................. 244/6; 244/17.23; 244/12.2; 416/129
[58] Field of Search .............. 244/17.21, 17.23, 17.25, 244/8, 12.2, 21, 23 C, 6, 17.11, 39, 7 R, 49; 416/129

[56] References Cited

U.S. PATENT DOCUMENTS

| | | | |
|---|---|---|---|
| 1,961,996 | 6/1934 | Williams | 244/8 |
| 2,008,424 | 7/1935 | Stalker | 244/6 |
| 2,054,610 | 9/1936 | Volpicelli | 244/6 |
| 2,334,286 | 11/1943 | Quickel | 244/6 |
| 2,611,554 | 9/1952 | Sanders | 244/6 |
| 2,807,428 | 9/1957 | Wibault | 244/23 C |
| 2,936,971 | 5/1960 | Holmes | 244/17.21 |
| 3,081,963 | 3/1963 | Thal | 244/6 |
| 3,409,248 | 11/1968 | Bryan | 244/6 |
| 3,417,825 | 12/1968 | Ramme | |
| 3,515,500 | 6/1970 | Nachod | 244/7 |
| 3,554,467 | 1/1971 | Yowell | 416/129 X |
| 3,612,445 | 10/1971 | Phillips | |
| 4,301,981 | 11/1981 | Hartt | 244/12.2 |
| 4,913,376 | 4/1990 | Black | 244/8 |
| 5,046,685 | 9/1991 | Bose | 244/12.2 |
| 5,064,143 | 11/1991 | Bucher | 244/12.2 X |

FOREIGN PATENT DOCUMENTS

| | | | |
|---|---|---|---|
| 1406269 | 6/1965 | France | 244/17.23 |
| 2328609 | 5/1977 | France | 416/129 |

Primary Examiner—Margaret A. Focarino
Assistant Examiner—Carla Mattix
Attorney, Agent, or Firm—Sheridan Ross & McIntosh

[57] ABSTRACT

A lift generating method and apparatus for aircraft is provided which generates lift in forward flight, in vertical flight or while hovering. A disk (24) is positioned between first and second counterrotating blade assemblies (22 and 36). The disk (24) generates lift in vertical flight or while hovering due to radial flow of air over an upper surface (28) thereof. In forward flight, the disk (24) functions as a fixed wing to generate lift. The assemblies (22 and 36) may be rotated to provide equal and opposite torques so that a torque compensating tail rotor is unnecessary.

47 Claims, 8 Drawing Sheets

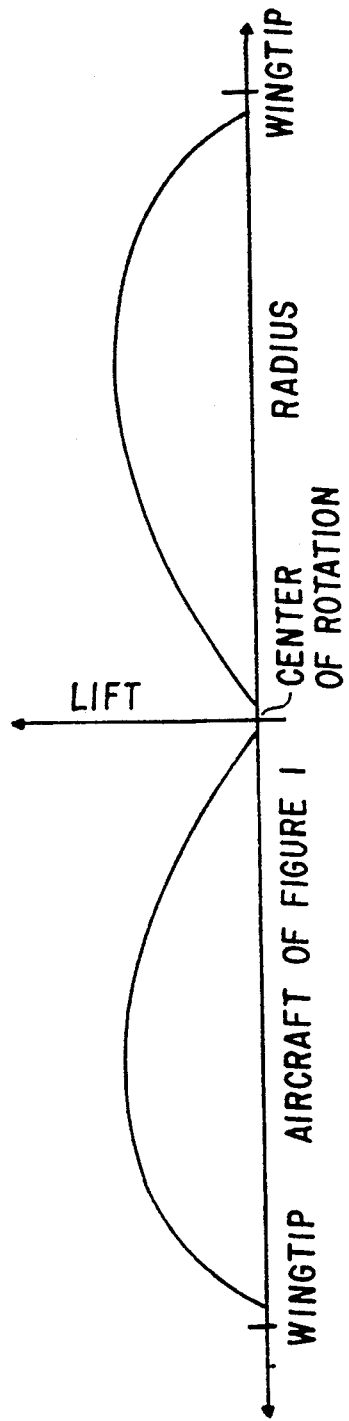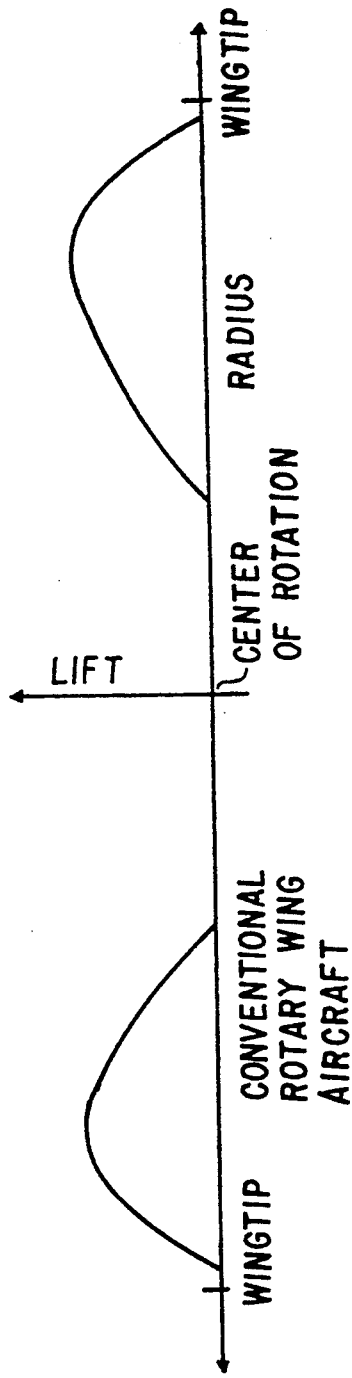

LIFT GENERATING METHOD AND APPARATUS FOR AIRCRAFT

TECHNICAL FIELD OF THE INVENTION

This invention relates in general to lift generating systems for aircraft, and in particular to a method and apparatus for generating lift in vertical and forward flight.

BACKGROUND OF THE INVENTION

Rotary wing aircraft such as helicopters have found many applications due to the vertical flight and hovering capabilities of such craft. These capabilities are achieved through the use of rotary wings, e.g., rotor blades having an airfoil cross-section. As used herein, the term "airfoil" refers to shapes capable of generating lift due to airflow thereabout from a leading to a trailing edge. Rotary wing aircraft are thus capable of generating lift even in vertical flight or while hovering because the rotary motion causes airflow about the surfaces of the rotary wings.

A disadvantage of conventional rotary wing aircraft, i.e., helicopters employing a single main rotor blade assembly in their principal lift generating system, is that such aircraft generally employ a heavy and power consuming tail rotor for torque compensation and yaw control. Torque is exerted on conventional rotary wing aircraft due to the rotation of the main rotor blade assembly which would result in rotation of the aircraft body if not counteracted. Typically, this torque is counteracted by use of a tail rotor which generates a torque equal but opposite to that of the main rotor blade assembly. The pitch of the tail rotor blades may also be adjustable to vary the torque generated by the tail rotor thereby providing helicopter yaw control. Thus, in conventional helicopters, a significant amount of power and weight is dedicated to the tail rotor for torque compensation and yaw control.

Another disadvantage of conventional rotary wing aircraft is the inefficiency and complexity of forward flight relative to fixed wing aircraft. In conventional rotary wing aircraft, a forward thrust is provided by angling the main rotor blade assembly relative to vertical so that a component of the force generated by the assembly is directed forward. By contrast, in a fixed wing aircraft, substantially all of the force generated by a propulsion assembly, such as a propeller or a jet engine, may be directed to provide a forward thrust.

In addition, conventional rotary wing aircraft generally employ a cyclical pitch control assembly to compensate for varying relative air speeds experienced by the rotor blades in forward flight. In rotation the rotor blade has an advancing portion, where the blade is rotating into the "wind" resulting from forward movement of the aircraft, and a retreating portion where the blade is rotating away from the wind. The speed of air relative to a rotor blade section and the force generated by the section in forward flight depends in part upon two components: the speed of forward flight and the speed of the rotor blade section due to rotation of the rotor assembly. As can be understood, these components will be generally additive during the advancing portion of a rotation and generally subtractive at the retreating portion. A complicated cyclical pitch assembly is generally employed in conventional rotary wing aircraft to vary the pitch of the rotor blade over a rotation cycle so that a substantially symmetrical lift and thrust distribution results. To facilitate forward flight, the rotor of conventional rotary wing aircraft is therefore complex in design and operation and generally inefficient in comparison with fixed wing aircraft.

Thus, it would be advantageous if the positive attributes of fixed wing and rotary wing aircraft could be combined. Desirably, such a craft would combine the hovering and vertical flight capability of rotary wing aircraft with the efficiency and simplicity of fixed wing aircraft in forward flight. Additionally, such a craft could preferably eliminate the need for a tail rotor to compensate for rotary wing torque thereby enhancing aircraft weight and power efficiency. Finally, further efficiencies would result if such a craft were provided with a fixed wing capable of generating lift in both forward and vertical flight.

SUMMARY OF THE INVENTION

The present invention disclosed herein comprises a lift generating method and apparatus for aircraft. The present invention employs counterrotating blade assemblies which generate substantially equal and opposite torques in order to eliminate the need for a torque compensating tail rotor. In addition, the present invention provides a disk assembly for generating lift which enhances lift generation in vertical flight or while hovering and functions similar to a fixed wing in forward flight. The invention may thus combine an improved rotary wing lift system for vertical flight with a fixed wing lift system for forward flight.

According to the present invention a method and apparatus for generating lift in vertical and forward flight is provided. The present invention comprises a means for imparting downward motion to ambient air and a disk having an airfoil cross-section positioned beneath a portion of and separated from the means for imparting downward motion. In vertical flight or while hovering, the disk generates lift due to radial flow of air over an upper surface thereof caused by the means for imparting downward motion. In forward flight, the disk functions as a fixed wing to generate lift.

According to one aspect of the present invention, the disk is positioned between first and second counterrotating blade assemblies. The first and second assemblies are rotated such that the assemblies generate equal and opposite torques, thereby obviating the need for a torque compensating tail rotor. The disk is provided with an airfoil cross section so that the disk functions as a fixed wing in forward flight.

According to another aspect of the present invention a disk for generating lift and a stabilizer for an aircraft are provided. The disk generates lift in vertical flight or while hovering due to radial flow over an upper surface of the disk. In addition, the disk has an airfoil cross-section so that it functions as a fixed wing in forward flight. A stabilizer is provided to compensate for a movement of the center of lift forward on the disk as the aircraft goes from vertical flight to forward flight. The stabilizer comprises, for example, a wing which pivots from a substantially vertical position in vertical flight to a substantially horizontal position in forward flight.

It is an advantage of the present invention that a disk is provided which is capable of generating lift in forward flight, vertical flight and while hovering. It is a further advantage of the present invention that counterrotating blade assemblies can be employed thereby eliminating the need for a heavy and power consuming tail rotor.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 7A is a graphic representation of the lift distribution of a conventional rotary wing aircraft;

FIG. 7B is a graphic representation of the lift distribution of the aircraft of FIG. 1.

DETAILED DESCRIPTION OF THE INVENTION

Throughout this description, the following terminology is utilized. "Chord" means a straight line connecting the leading and trailing edges of an airfoil. "Cambered airfoil" means an airfoil which is not symmetrical about its chord line, e.g., an airfoil wherein the distance from the leading edge to the trailing edge measured along a contour of an upper surface of the airfoil is greater than the distance from the leading edge to the trailing edge measured along a contour of a lower surface of the airfoil. "Yaw" means rotation of an aircraft about a vertical axis. Finally, "pitch" means the inclination of a longitudinal axis of an aircraft or chord of an airfoil relative to the horizontal.

Figure 1:
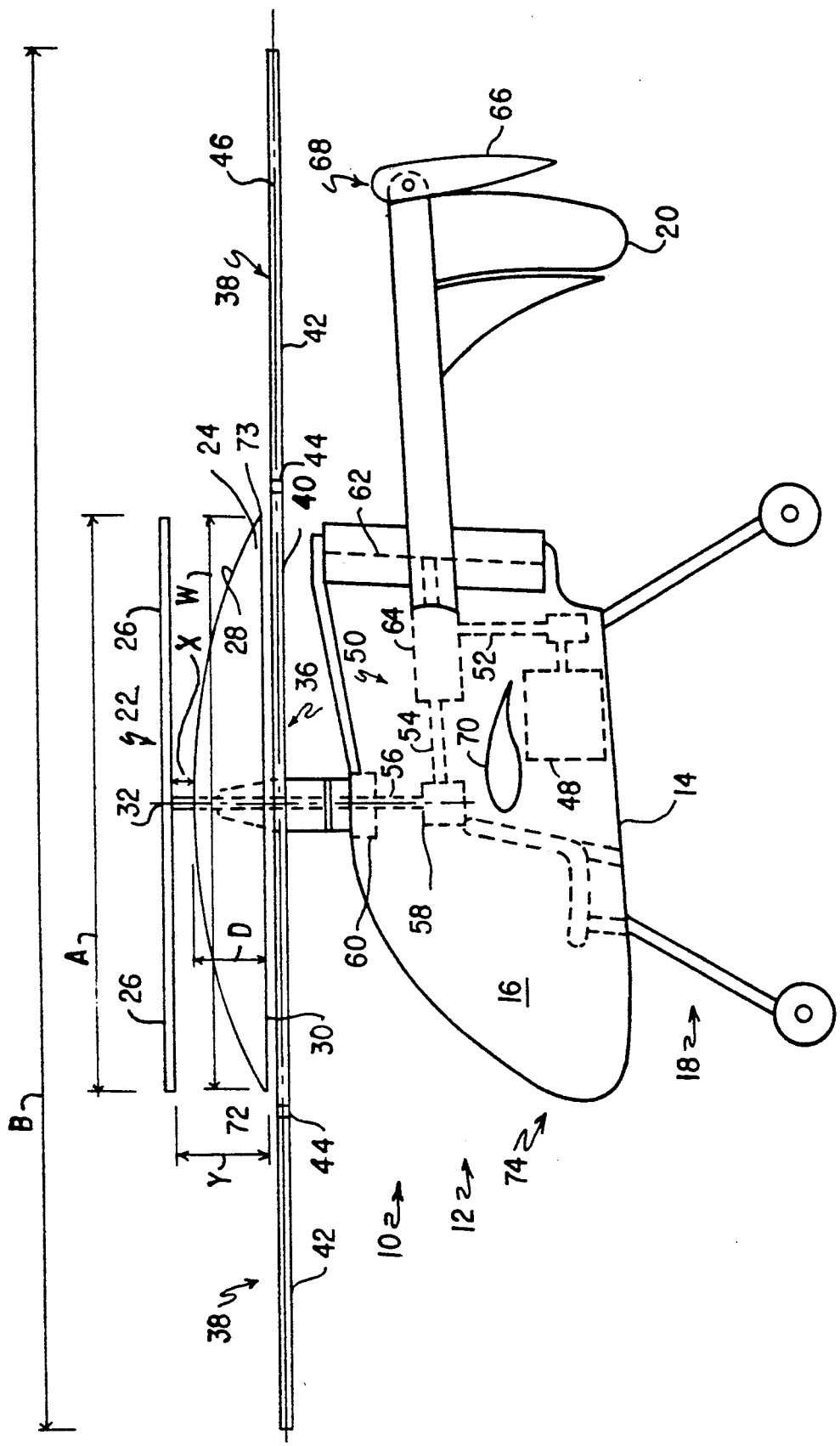
FIG. 1 is a side elevation of an aircraft comprising a lift generating apparatus constructed in accordance with an embodiment of the present invention in a vertical flight configuration.
Figure 2:
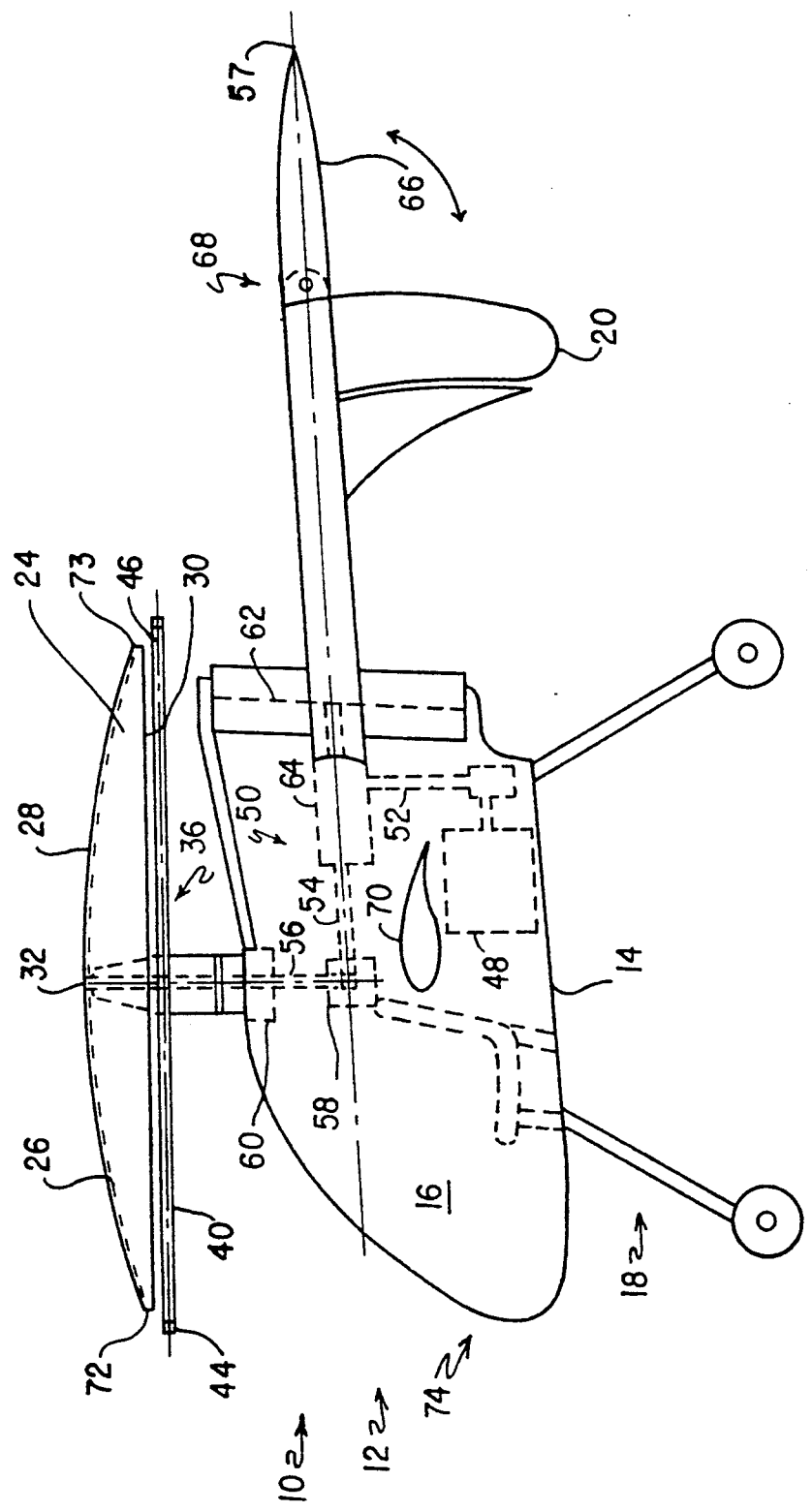
FIG. 2 is a side elevation of the aircraft of FIG. 1 in a forward flight configuration.

In FIGS. 1 and 2, like items are identified by like and corresponding numerals for ease of reference. Referring first to FIG. 1, a lift generating apparatus constructed in accordance with an embodiment of the present invention is generally identified by the reference numeral 10. An aircraft 12 which employs the apparatus 10 may comprise a fuselage 14, similar to that employed in conventional helicopters, including an operator cockpit area 16, landing gear 18, and a rudder 20 for yaw control in forward flight. The landing gear 18 may comprise wheels (shown) as commonly used for landings by fixed wing aircraft, rails as commonly used in conventional helicopters for vertical landings, or pontoons. Preferably, the landing gear 18 comprises wheels so that the aircraft 12 is capable of conventional fixed wing aircraft type runway landings as well as conventional rotary wing aircraft type vertical landings.

The lift generating apparatus 10 comprises an assembly 22 for imparting downward motion to ambient air and an opposing surface or disk 24 for generating lift in vertical and forward flight. The assembly 22 may comprise a propeller, a jet engine, blower outlet or other device capable of providing a downward air flow. In the illustrated embodiment, the assembly 22 comprises a first counterrotating blade assembly 23 including a plurality of fan blades 26. The fan blades 26 may have a cambered airfoil cross-section and may be set at a fixed optimum pitch for static lift. That is, the angle of attack of portions of the fan blades 26 may be set to generate optimum lift during operation in a manner known in the art.

The assembly 22 is located above the disk 24 so that air is forced downward by the assembly 22 towards an opposing upper surface 28 of the disk 24. Lift is thereby generated as the downwardly forced air flows radially (see FIG. 6) over the upper surface 28 resulting in a low pressure area over the disk 24. In the illustrated embodiment, an axis of rotation of the fan blades 26 coincides with a central vertical axis, generally identified by a line 32, through the disk 24. Preferably, a diameter of rotation A of the fan blades 26 is approximately equal to width W of the disk 24 and A is not greater than 1.3W so that a downward airflow is created over the area of the disk 24 and the fan blades 26 can be folded into the disk 24 in forward flight as will be described below. To enhance the lift created by radial flow of air over the disk 24, the fan blades 26 rotate a distance X above the upper surface 28 that is preferably not more than 1½ times a depth D of the disk 24. Thus, the vertical distance Y from the blades 26 to the leading edge 72 of the disk 24 should be less than about 2½ D. Although the fan blades 26 are shown located a distance X away from the disk 24, it is to be understood that the blades 26 could be located immediately above the disk 24.

Figure 3:
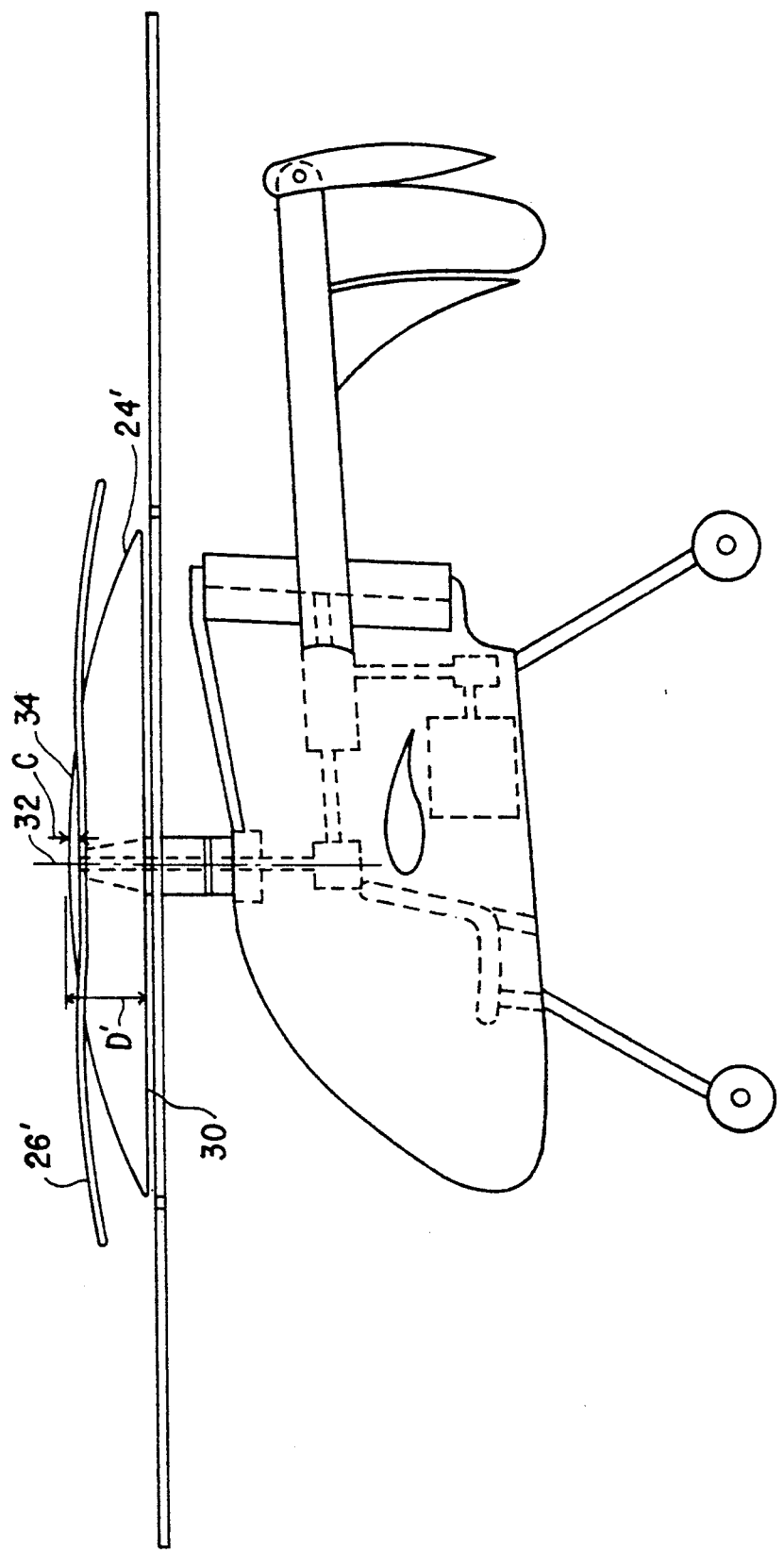
FIG. 3 is a side elevation of an aircraft comprising a lift generating apparatus constructed in accordance with an alternative embodiment of the present invention.

Referring to FIG. 3, alternatively, a disk 24' could be truncated with a cap 34 provided above fan blades 26'. In the embodiment of FIG. 3, a depth C of the cap 34 should be less than one-half of a depth D' of the combined truncated disk 24' and cap 34 so that the radial flow lift aspect of the disk 24' is enhanced. However, in the embodiments of both FIGS. 1 and 3, it is preferred that the fan blades 26 and 26' be separated, i.e., operatively disassociated, from the disks 24 and 24' since it is not necessary to rotate the disks 24 and 24'.

Figure 8:
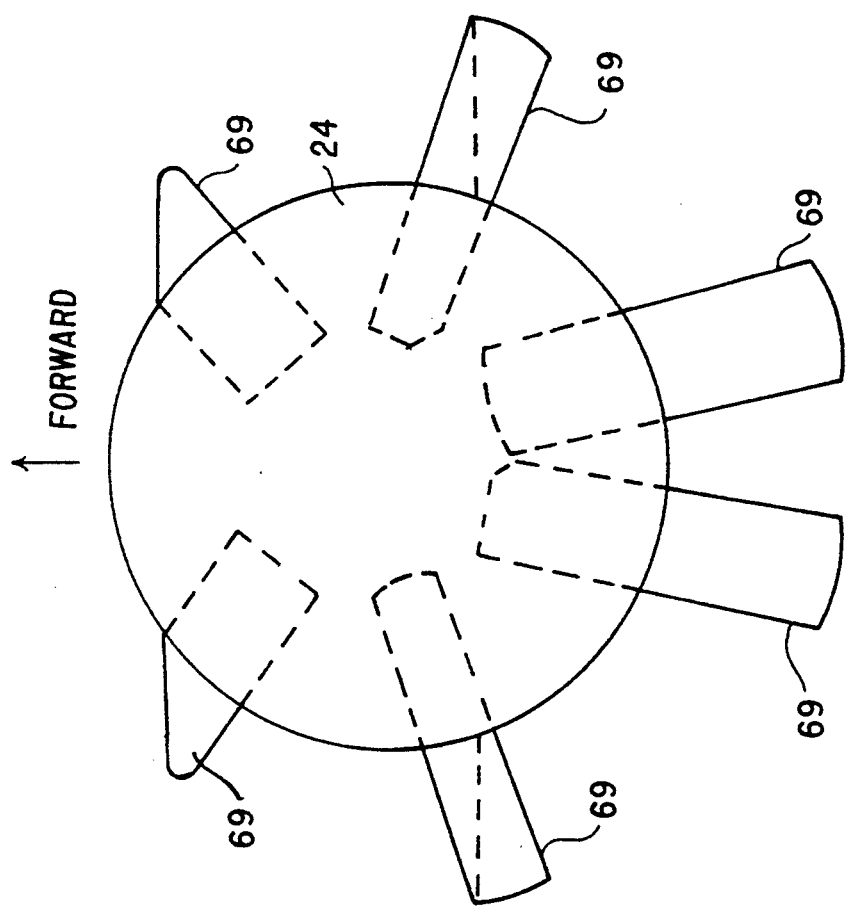
FIG. 8 is a top plan view of a disk constructed in accordance with an embodiment of the present invention.

Referring again to FIG. 1, the disk 24 has an airfoil cross-section and comprises, for example, a lenticular shaped disk having a generally spherical or parabolic upper surface 28. Preferably, though not essentially, the disk 24 is generally circular in a top plan view, as shown in FIG. 8, so that lift is generated efficiently and a generally symmetrical lift distribution pattern results in vertical flight. However, other shapes may be employed or the disk 24 may include retractable control surfaces 69 (FIG. 8) which can be stored within the disk 24 in vertical flight and deployed external to the disk 24 in forward flight to function as flaps, stabilizers, elevons or other control surfaces thereby enhancing stability and maneuverability. The disk 24 has a low profile lower surface 30 which may be flat, concave or convex. Thus, the distance from a leading edge 72 to a trailing edge 73 of the disk 24 measured along a contour of the upper surface 28 is greater than that measured along a contour of the lower surface 30. In addition, the disk 24 preferably has a depth D of about 5% to 20% of the width W of the disk 24. As will be understood from the description below, the shape of the disk 24 allows the disk 24 to function as a fixed wing in forward flight. The disk 24 thus generates lift when the aircraft 1 is in vertical flight, forward flight or while hovering.

In the illustrated embodiment, a second counterrotating blade assembly 36 is provided below the disk 24 such that the center of rotation of the assembly 36 coincides with the central axis 32. The assembly 36 comprises a plurality of rotors 38 which comprise inner sections 40 attached to outer sections 42 at points 44. The outer sections 42 include a chordwise airfoil cross-section so that the rotors 38 generate lift when rotated. The rotors 38 are attached to the aircraft 12 to allow collective and differential pitch control thereof. That is, the pitch of all of the rotors 38 may be varied together to vary the total lift generated by the assembly 36 or the pitch of individual rotors 38 may be varied, for example, to allow cyclical pitch control. For example, a swashplate, such as is commonly employed in conventional rotary wing aircraft may be provided near the axis of rotation of the rotors 38 to provide pitch control thereto. Alteratively, pitch control of only the outer sections 42 may be accomplished by controlling pitch at the points 44. The inner sections 40 extend approximately to the peripheral edge of the disk 24 and may comprise tubes, conduits, frameworks or any other appropriate structural elements. It is preferred that the inner sections 40 comprise tubular elements, such as tubes or conduits so that collective and differential pitch control of the rotors 38 may be accomplished by simply rotating the rotors 38 about a longitudinal axis, generally identified by a line 46, thereof.

Preferably, the width W of the disk 24 is about 30-40% of a diameter of rotation B of the rotors 38. In a particular embodiment, the width W of the disk and the diameter of rotation A of the fan blades 26 may be about 110 inches and the diameter of rotation B of the rotors 38 may be about 330 inches. These dimensions allow the rotors 38 to be stored beneath the disk 24 and the fan blades 26 to be stored in the upper surface 28 of the disk 24 when the aircraft is in a forward flight configuration, as will be described below.

In vertical flight or while hovering, the fan blades 26 and the rotors 38 may be rotated in opposite directions and at such speeds that substantially equal and opposite torques are generated. Thus it is not necessary to use a tail rotor and savings in power requirements and in the overall weight of the aircraft 12 are achieved.

A power source 48, such as an engine, and a suitable transmission 50 are provided to rotate the fan blades 26 and the rotors 38. The transmission 50 may comprise any appropriate assembly by which equal and opposite torques may be delivered to the first assembly 22 and the second assembly 36. As illustrated, the transmission 50 comprises: a first drive shaft 52; a drive linkage 54, e.g., a belt, chain, or crank arm, between the power source 48 and the first shaft 52 to transmit power to the shaft 52; a second drive shaft 56; and a 90° power transfer case 58 to transfer power from the first shaft 52 to the second shaft 56. The second shaft 56 may be interconnected to the first assembly 22 and second assembly 36 through a self-compensating differential drive system, generally identified by a box 60, such as commonly employed in automobiles, which equalizes torque regardless of the relative rotation speeds of the first assembly 22 and second assembly 36. It is to be understood that other transmission devices could be provided without departing from the spirit and scope of the present invention. For example, if the configuration of the fuselage 14 allowed, the output of the power source 48 could be delivered directly to the second drive shaft 56 thereby eliminating the first drive shaft 52 and the 90° power transfer case 58. However, the particular embodiment described has the advantage that power may be transferred from the first assembly 22 and second assembly 36 to a propulsion means 62, such as a propeller, as the aircraft 12 goes from vertical to forward flight. Finally, in the illustrated embodiment, an air uptake 64 is provided to supply air to the power source 48 for cooling and combustion purposes.

The illustrated apparatus 10 is also provided with a pivotable stabilizer 66. The stabilizer 66 comprises, for example, a wing located on a tail portion 68 of the aircraft 12. As can be seen in FIG. 1, the illustrated stabilizer 66 has a cambered airfoil side cross-section. In vertical flight or while hovering, the stabilizer 66 is deployed in a substantially vertical position to reduce resistance to the downward airflow due to the downwash of the rotors 38. As will be described below, the stabilizer 66 is pivotable to a substantially horizontal position (see FIG. 2) for forward flight.

Figure 6:
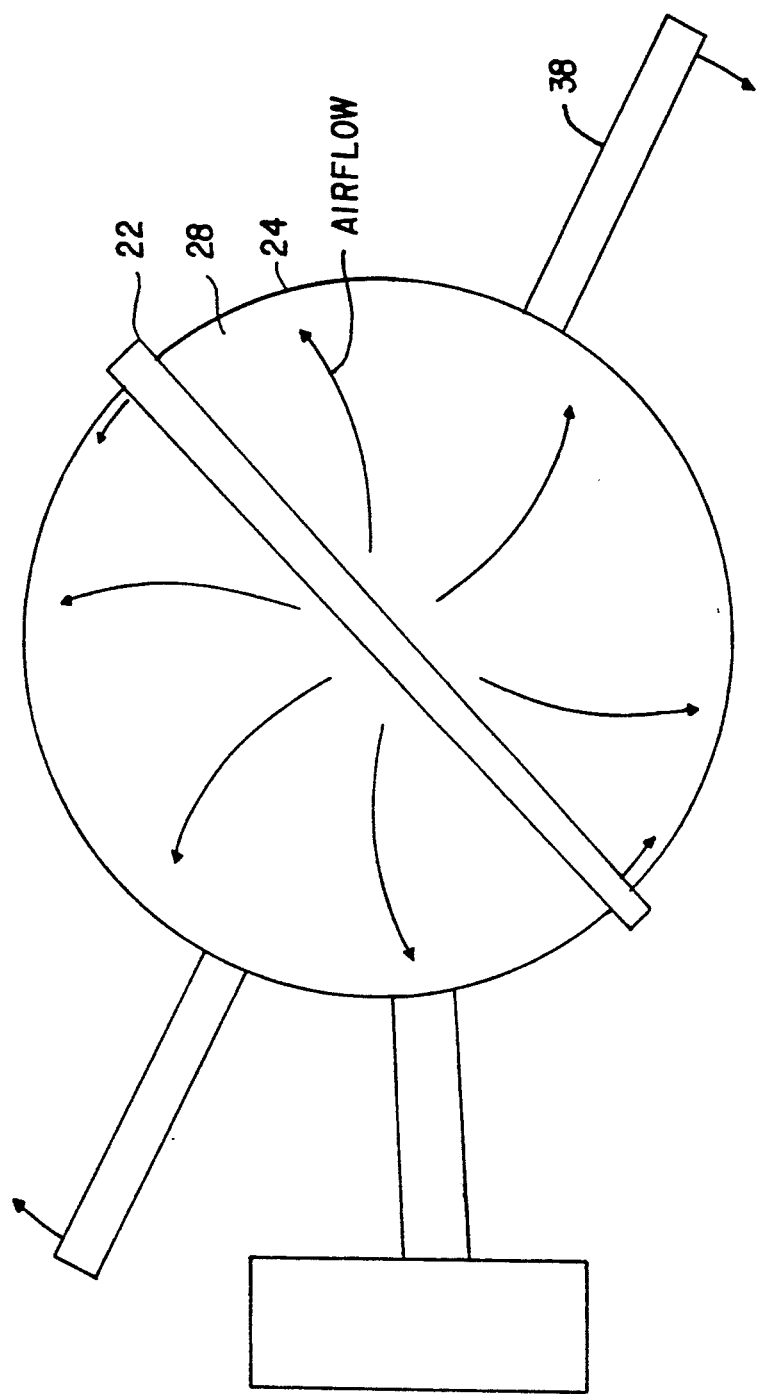
FIG. 6 is a top elevation diagram illustrating airflow created by the aircraft of FIG. 1.

Thus, in vertical flight or hovering operation, the illustrated embodiment of the present invention provides an improved rotary wing lift generating method and apparatus. The first assembly 22 and the second assembly 36 can be rotated in opposite directions s that substantially equal and opposite torques are generated, thereby eliminating the need for a heavy and power consuming tail rotor for torque compensation. Aircraft yaw control may be accomplished by applying brakes to the drive systems of the first assembly 22 and the second assembly 36 to provide a differential torque for yaw control. The first assembly 22 imparts downward motion to ambient air so that the air is urged towards the upper surface 28 of the disk 24. Lift is thereby created due to the radial flow of air over the curved upper surface 28 of the disk 24 as shown in FIG. 6. The downwash of air leaving the disk 24 results in a more even radial lift distribution across the outer sections 42 of the rotors 38 enhancing the overall lift by the apparatus 10.

Figure 4:
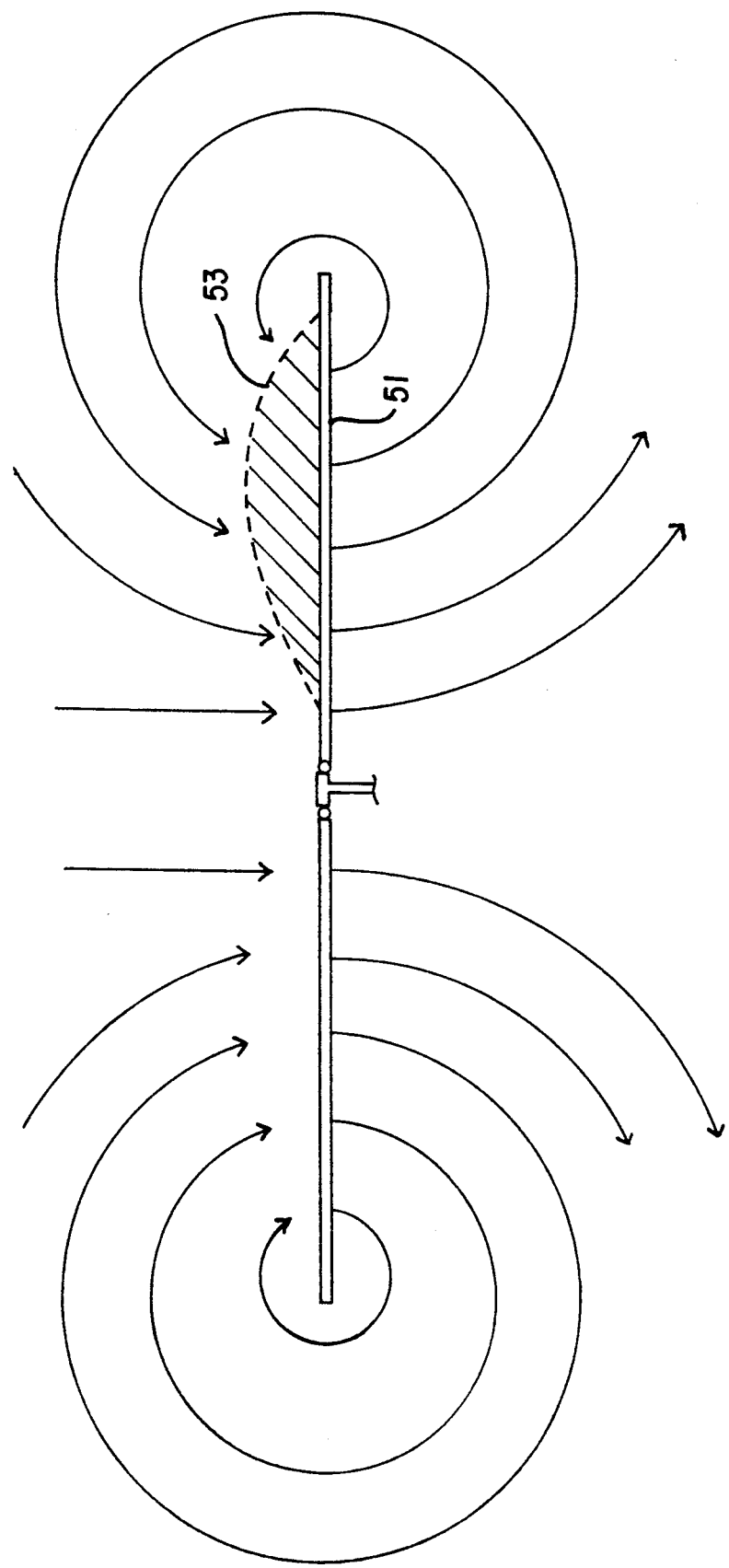
FIG. 4 is a representation of airflow created by an aircraft constructed in accordance with the prior art.

The present invention thus has a number of advantages over the lift systems of conventional rotary wing aircraft in vertical flight or while hovering. First, the present invention generates lift more efficiently. The inner sections of conventional rotary wings generate relatively little lift due, in part, to the fact that the inner sections of a rotary wing move slower than the outer sections because of their shorter radius of rotation. In addition, the lift efficiency of conventional rotary wings may be reduced because of toroidal airflow about such wings (as shown in FIG. 4). That is, the downwash from such a wing may circulate up around the periphery of the rotating rotary wing 51 (FIG. 4) and again flow down through the rotary wing 51, thereby further reducing the air acceleration and lift generation by the inner sections of such rotary wings. Thus lift is significant only on approximately ⅔ of the overall diameter of rotation of the blade 51, specifically with approximately the middle having no or minimal lift as generally shown in FIGS. 7A and 7B.

Figure 5:
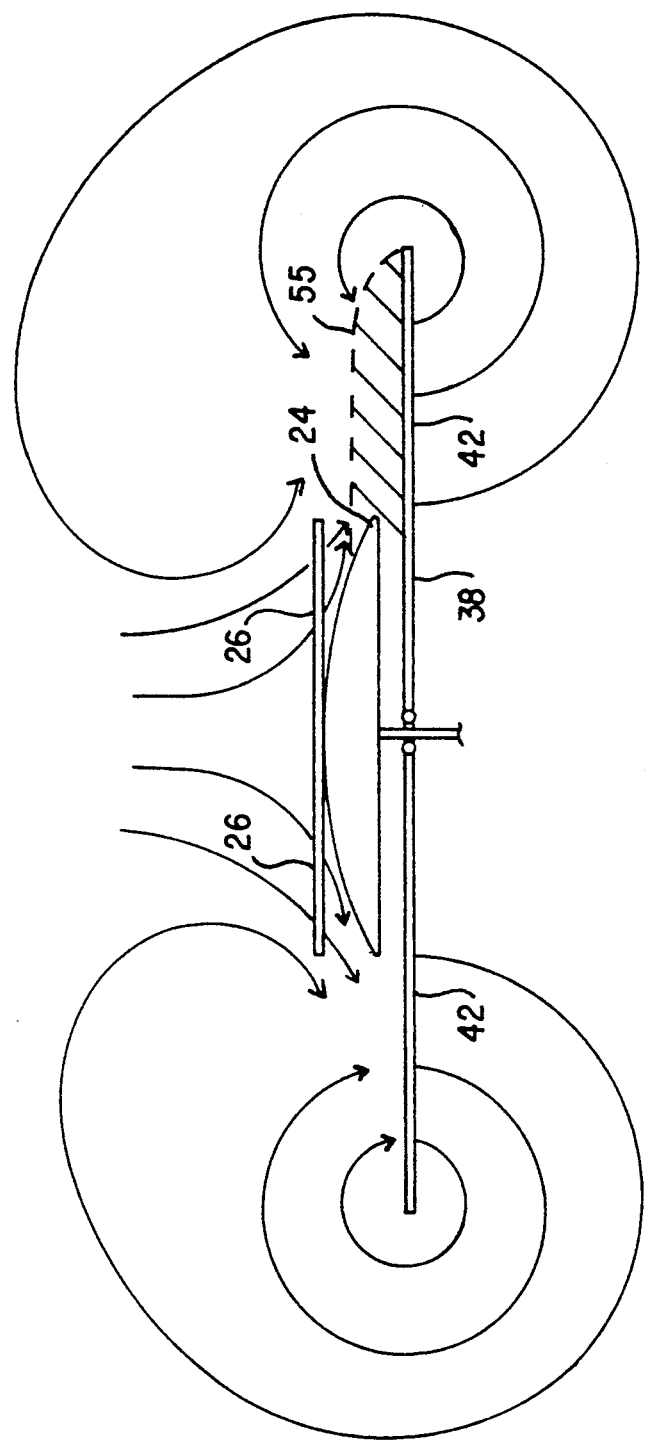
FIG. 5 is a representation of airflow created by the aircraft of FIG. 1.

In comparison, the present invention provides significant lift generation even near the central axis 32 (as shown by FIG. 7B). Because the fan blades 26 may be shorter than conventional rotary wings, they can be rotated faster than the speed at which conventional rotary wings are typically rotated with less power consumption and without the complication of supersonic wing tips. This greater speed of rotation thereby allows significant lift production at relatively shorter radii of rotation. In addition, lift is generated near the central axis 32 due to radial flow of air over the disk means 24 (as shown in FIGS. 5 and 6). Thus, the present invention provides significant lift in a region which is relatively unproductive in conventional rotary wing lift systems.

Further efficiencies result from elimination of the tail rotor commonly employed by conventional rotary wing aircraft. The tail rotor is employed to provide a force to compensate for the torque generated by the rotary wing in such conventional aircraft. In accordance with the present invention, the first counterrotating assembly 22 compensates for torque generated by rotation of the second counterrotating assembly 36. As discussed above, such an assembly not only provides torque compensation but also contributes to lift production, thereby enhancing efficiency.

The present invention also allows for simplified rotor construction and profile relative to conventional rotary wings. According to the present invention, the inner sections 40 of the rotors 38 need not be provided with an airfoil cross-section. The inner sections of conventional rotary wings commonly comprise an airfoil cross-section set at a higher angle of attack than the outer sections to partially compensate for the lower speed at which the inner sections encounter air. Conventional rotary wings therefore are commonly twisted about their longitudinal axis. The present invention reduces the need for such twist because the outer sections 42 of the rotors 38 may be significantly shorter than the overall length of conventional rotary wings and operate in an area outside of the relatively unproductive lift producing inner areas.

The reduced length of the outer sections 42 relative to conventional rotary blades which may be achieved according to the present invention, and the fact that the outer sections 42 operate outside the unproductive lift producing inner areas may also result in reduced bending forces on the rotors 38. Referring again to FIGS. 4 and 5, the lift generated by a section of a conventional rotary wing 51 is generally indicated by the height of the shaded region 53 (FIG. 4) above the section and, similarly, the lift generated by a section of a rotor 38 is generally indicated by the height of the shaded region 55 (FIG. 5) above the section. As shown, lift varies substantially along the length of the rotary wing 51 which results in a force which may tend to bend the wing 51. It is anticipated that a more even lift distribution and reduced bending forces will be achieved, according to the present invention as shown by the region 55 in FIG. 5, due to enhanced lift resulting from the downwash of air from the disk 24. Finally, because the outer sections 42 of the illustrated embodiment may be lighter than conventional rotary wings due to their reduced length and structural demands, control torque forces, e.g., to change the inclination of the outer sections 42 for differential pitch control, may be reduced.

Referring again to FIG. 2, a side view of the apparatus 10 in a forward flight configuration is shown. According to the present invention, a propulsion device 62 is provided to impart forward motion to the aircraft 12 for forward flight. The propulsion device 62 may comprise, for example, a jet engine, a turbo-prop engine or a propeller. As illustrated, the propulsion device 62 comprises a propeller which, as discussed above, may be driven by the same power source 48 used to drive the first assembly 22 and the second assembly 36 in vertical flight or while hovering. The aircraft 12 may also comprise wings 70 having control surfaces, such as flaps, to provide additional lift and roll (i.e., rotation about a longitudinal axis 57) capability in forward flight.

In forward flight, the disk 24 functions as a fixed wing to generate lift as air flows thereabout from a leading edge 72 to a trailing edge 73 thereof. During the transition from vertical flight or hovering to forward flight, the center of lift of the disk 24 moves forward from substantially coincident with the central axis 32 towards the leading edge 72 of the disk 24. As a result, a pitching moment, as is known in the art, is created causing a nose portion 74 of the aircraft 12 to tend to rise. This pitching moment is counteracted by the stabilizer 66 which comprises, for example, a lift generating wing located near the tail portion 68 of the aircraft 12 or a negative lift generating wing (not shown) located near the nose portion 74. In the illustrated embodiment, the stabilizer 66 comprises a wing having a cambered airfoil cross-section located on the tail portion 68 of the aircraft 12. The stabilizer 66 is pivotable from a substantially horizontal position in vertical flight or while hovering (FIGS. 1 and 3) to a substantially horizontal position as shown in FIG. 2. The stabilizer 66 may be reconfigured so that the lift and moment generated by the stabilizer 66 can be varied. For example, the stabilizer 66 may include control surfaces such as flaps thereon which can be activated to provide a relatively high lift configuration and a relatively low lift configuration. Alternatively, the stabilizer 66 may be pivoted so that lift generation is varied by varying the angle of attack.

The fan blades 26 and rotors 38 of the illustrated embodiment in forward flight may be allowed to autorotate, as in an autogyro, or they may be stopped so that a fully fixed wing type of flight is achieved. In the latter case, means may be provided whereby the fan blades 26 may be withdrawn into shallow recesses in the upper surface 28 of the disk 24. For example, cables and a motor (not shown) to feed and withdraw the cables may be provided to bend or fold the blades 26 downwardly into the recesses and secure them therein.

Additionally, the rotors 38 may be withdrawn beneath the disk 24. The rotors 38 may be withdrawn beneath the disk 24 by radial retraction or by folding. For example, the rotors 38 may be capable of telescopic radial retraction from an extended to a retracted position such that, for example, the outer sections 42 can slide over the inner sections 40. Extension and retraction could then be accomplished by biasing, e.g. through use of an elastic member, the rotors 38 towards the retracted position such that the rotors would only go to the extended position when the centrifugal force of rotation urged the outer sections 40 towards the extended position. Alternatively, the rotors could move between the extended and retracted positions by folding and unfolding of the rotors 38, for example, about pivots at the points 44. If such pivots were provided, it is anticipated that the rotors 38 would automatically fold to the retracted position due to drag forces as the speed of rotation of the rotors 38 slowed and centrifugal force thereon decreased. Conversely, as the speed of rotation of the rotors 38 increased, the rotors 38 could automatically move to the extended position due to centrifugal force. If desired, the rotors 38 could be biased, e.g., by use of an elastic member, towards the retracted position such that the rotors 38 would only go to the extended position when sufficient centrifugal force urged the rotors 38 to the extended position. Of course, a motor to drive the rotors 38 between the extended and retracted positions could be provided.

Thus, in operation, the illustrated embodiment of the present invention combines an improved rotary wing lift system for vertical flight or hovering with fully fixed wing flight capability for forward flight. In vertical flight or hovering, the fan blades and rotors are rotated in opposite directions to provide first and second counterrotating assemblies. The assemblies are rotated to generate equal and opposite torques so that a torque compensating tail rotor is unnecessary. The disk generates lift in vertical flight or while hovering due to radial flow of air thereover. A stabilizer is deployed in a substantially vertical position to reduce resistance to downwash from the rotors.

A propulsion device imparts forward motion to the aircraft for forward flight. In forward flight, the disk functions as a fixed wing to generate lift. The fan blades may be withdrawn into recesses in the upper surface of the disk, and the rotors may be withdrawn beneath the disk to provide fully fixed wing flight. The present invention thus provides an aircraft which combines the vertical flight and hovering capability characteristic of rotary wing aircraft with the forward flight efficiency of fixed wing aircraft.

Although the present invention has been described with respect to specific embodiments thereof, various changes and modifications may be suggested to one skilled in the art, and it is intended that the present invention encompass such changes and modifications as fall within the scope of the appended claims.

What is claimed is:

1. An apparatus for generating lift in forward and vertical flight, comprising:
blade means, rotatable about a substantially vertical axis, for imparting motion to air in a downward direction; and
disk means, disposed beneath and operatively separated from said blade means, formed in the shape of a circular airfoil such that said disk means functions as a wing to generate lift in forward flight, said disk means having a vertical depth which is between about 5 to 20 percent of the diameter of the disk means and including a convex upper surface defined by an outer, circular edge, wherein lift is generated in vertical flight due to radial airflowover said upper surface towards said circular edge, said apparatus capable of generating lift sufficient to support both vertical and forward flight.

2. The apparatus of claim 1, wherein said blade means comprises a plurality of rotating blades each having a length substantially equal to a radius of said disk means.

3. The apparatus of claim 1, wherein said blade means comprises a plurality of rotating blades having a diameter of rotation which is less than 1.3 times a width of said disk means.

4. The apparatus of claim 1, further comprising:
a counterrotating blade means disposed beneath said disk means.

5. The apparatus of claim 4, wherein said blade means and said counterrotating blade means generate substantially equal and opposite torques.

6. The apparatus of claim 1, wherein a vertical distance between said disk means and said blade means is less than 1.5 times a vertical depth of said disk means.

7. The apparatus of claim 1, wherein said disk means has a generally parabolic upper surface.

8. The apparatus of claim 1, wherein said disk means further comprises a low profile lower surface so that a distance from a leading edge to a trailing edge of said disk means along a contour of said upper surface is greater than a distance from said leading edge to said trailing edge along a contour of said lower surface.

9. The apparatus of claim 1, wherein said disk means comprises a control surface to enhance stability or maneuverability in forward flight.

10. The apparatus of claim 1, further comprising:
a stabilizer to compensate for movement of a center of lift of said disk means as said disk means goes from vertical to forward flight.

11. The apparatus of claim 10, wherein said stabilizer comprises a wing for further generating lift and said wing is moveable from a substantially vertical position for generally vertical flight to a substantially horizontal position for generally forward flight.

12. An aircraft, comprising:
a first counterrotating blade assembly rotating in a first direction to produce a first downward airflow and a second counterrotating blade assembly rotating in a second direction opposite said first direction to produce a second downward airflow; and
disk means for generating lift disposed between and free from rotational interconnection with said assemblies, said disk means positioned downstream from said first assembly to provide lift to the aircraft in vertical flight due to radial airflow over said disk means and functioning as a wing to provide lift in forward flight wherein said second assembly extends radially beyond an edge of said disk means to interact with said radial airflow flowing over said edge.

13. The aircraft of claim 12, wherein said disk means comprises a disk having a curved first surface adjacent said first blade assembly.

14. The aircraft of claim 13, wherein said disk means generates lift in vertical flight due to high speed radial flow over said curved first surface.

15. The aircraft of claim 12, wherein said disk means comprises a disk having a depth generally transverse to a diameter of said disk, and said depth is approximately 5 percent to 20 percent of said diameter.

16. The aircraft of claim 12, wherein said first and second blade assemblies generate equal and opposite torques.

17. The aircraft of claim 12, further comprising:
a power source; and
a differential drive means to transfer power to said first and second blade assemblies from said power source.

18. The aircraft of claim 12, further comprising:
propulsion means for imparting forward motion to the aircraft.

19. The aircraft of claim 12, wherein said disk means is rotationally fixed with respect to said aircraft.

20. The aircraft of claim 12, further comprising stabilizer means for compensating for a change in location of a center of lift of said disk means as the aircraft changes from vertical to forward flight.

21. The aircraft of claim 20, wherein said stabilizer means comprises a wing pivotally mounted on a tail section of the aircraft.

22. The aircraft of claim 21, wherein said wing is moveable from a first position with a longitudinal axis thereof substantially vertical to a second position wherein said longitudinal axis becomes substantially horizontal, said wing providing further lift in said second position during forward flight.

23. The aircraft of claim 12, wherein said second blade assembly comprises a plurality of blades each with a radially inner portion having a length approximately equal to a radius of said disk means and a radially outer portion having an air foil cross-section.

24. The aircraft of claim 23, further comprising connection means between said inner and outer portions for providing collective and differential pitch control to said outer portion of said second blade assembly.

25. The aircraft of claim 12, wherein said second blade assembly comprises a plurality of blades radially moveable between an extended position and a retracted position in order to contain said blades substantially beneath said disk means in said retracted position.

26. The aircraft of claim 25, wherein said blades are biased towards said retracted position and move to said extended position when said second blade assembly is rotated.

27. The aircraft of claim 12, wherein said second blade assembly comprises a plurality of blades moveable between a folded and an unfolded position such that said blades are contained substantially beneath said disk means in said folded position.

28. The aircraft of claim 27, wherein said blades are biased towards said folded position and move to said unfolded position when said second blade assembly is rotated.

29. The aircraft of claim 27, wherein said blades are moveable to said folded position by drag forces as rotation of said assembly, slows.

30. The aircraft of claim 12, wherein said first blade assembly comprises a plurality of blades each having a length approximately equal to a radius of said disk means.

31. The aircraft of claim 12, wherein said first blade assembly comprises a plurality of blades each having a length less than 1.3 times a radius of said disk means.

32. The aircraft of claim 12, wherein said first blade assembly comprises a plurality of blades each having an airfoil cross-section set at a fixed pitch for optimum static lift.

33. The aircraft of claim 12, wherein said first blade assembly comprises a plurality of blades each foldable into cavities on an adjacent surface of said disk means.

34. A lift generating apparatus for an aircraft, comprising:
 means for moving air downwardly;
 disk means for generating lift positioned beneath said means for moving air downwardly, said disk means generating lift in vertical flight due to radial airflow thereover resulting from downwardly directed airflow against said disk means and in forward flight due to airflow about said disk means from a leading to a trailing edge thereof;
 a rotary wing assembly, disposed beneath said disk means, including a plurality of rotors each having an airfoil cross-section and a radius of rotation greater than a radius of said disk means; and
 a pivotable stabilizer for selectively generating a pitching moment, wherein said stabilizer is capable of compensating for movement of a center of lift of said disk means as said aircraft goes between vertical and forward flight.

35. The apparatus of claim 34, wherein said stabilizer is disposed at a tail portion of the aircraft.

36. The apparatus of claim 34, wherein said stabilizer comprises a wing moveable between a substantially vertical position for vertical flight and a substantially horizontal position for forward flight.

37. The apparatus of claim 34, wherein said disk means comprises a disk having a convex upper surface and a low profile lower surface so that a distance from said leading edge to said trailing edge along a contour of said upper surface is greater than a distance from said leading edge to said trailing edge along a contour of said lower surface.

38. The apparatus of claim 34, wherein said means for moving comprises a rotary wing.

39. A method for generating lift in forward or vertical flight, comprising the steps of:
 rotating a first counterrotating blade assembly about a substantially vertical axis;
 rotating a second counterrotating blade assembly about said axis so that said first and second assemblies generate substantially equal and opposite torques; and
 positioning a disk means, formed in the shape of a circular airfoil, beneath said first assembly and above said second assembly so that said disk means generates lift in vertical flight due to radial airflow thereover and generates lift in forward flight due to airflow thereabout from a leading to a trailing edge thereof.

40. The method of claim 39, further comprising the step of:
 providing a pitching moment with a stabilizer to compensate for movement of a center of lift of said disk means.

41. The method of claim 40, wherein said step of providing a pitching moment comprises:
 pivoting said stabilizer between a substantially horizontal and a substantially vertical position.

42. The method of claim 39, further comprising the steps of:
 withdrawing said first assembly into a recess of said disk means; and
 withdrawing said second assembly beneath said disk means.

43. The method of claim 42, wherein said step of withdrawing said first assembly comprises exerting a downward force on said assembly to bend said assembly.

44. The method of claim 42, wherein said step of withdrawing said second assembly comprises radially retracting said assembly.

45. The method of claim 42, wherein said step of withdrawing said second assembly comprises folding said assembly.

46. The method of claim 45, further comprising the step of:
 slowing a rate of rotation of said second assembly so that drag forces cause said assembly to fold.

47. The method of claim 42, wherein said second assembly is moveable from an extended to a withdrawn position and further comprising the step of biasing said second assembly towards said retracted position, wherein said assembly moves from said retracted position to said extended position due to centrifugal force resulting from rotation of said second assembly.

* * * * *